(12) United States Patent
Polick

(10) Patent No.: US 7,354,070 B2
(45) Date of Patent: Apr. 8, 2008

(54) BOOK WITH ROTATING DEVICE

(75) Inventor: Peter Polick, New York, NY (US)

(73) Assignee: Innovative USA, Inc., Norwalk, CT (US)

( * ) Notice: Subject to any disclaimer, the term of this patent is extended or adjusted under 35 U.S.C. 154(b) by 188 days.

(21) Appl. No.: 10/971,389

(22) Filed: Oct. 22, 2004

(65) Prior Publication Data

US 2006/0087110 A1    Apr. 27, 2006

(51) Int. Cl.
    *B42D 5/00*    (2006.01)
(52) U.S. Cl. ..................... 281/15.1; 434/404
(58) Field of Classification Search ............... 281/15.1, 281/21.1, 29, 36–38; 446/147, 151, 152; 434/404
    See application file for complete search history.

(56) References Cited

U.S. PATENT DOCUMENTS

| | | | |
|---|---|---|---|
| 4,537,576 A * | 8/1985 | Thorsheim et al. | 434/404 |
| 4,634,385 A | 1/1987 | Stemper | |
| 4,642,054 A * | 2/1987 | Wada | 434/178 |
| 5,310,994 A * | 5/1994 | Thabet et al. | 235/77 |
| 5,618,180 A * | 4/1997 | Nathanson | 434/156 |
| 6,386,880 B2 | 5/2002 | Bryant | |
| 6,402,523 B1 * | 6/2002 | Kaufman et al. | 434/404 |
| 6,447,300 B1 | 9/2002 | Greenberg | |
| D469,801 S * | 2/2003 | Scott et al. | D19/26 |
| 6,648,647 B2 | 11/2003 | Wood et al. | |
| 6,716,033 B1 | 4/2004 | Lassowsky | |
| 2004/0009460 A1 * | 1/2004 | Polick | 434/309 |

* cited by examiner

*Primary Examiner*—Dana Ross
(74) *Attorney, Agent, or Firm*—Alan Clement

(57) ABSTRACT

A book with at least one rotating device that allows the user to answer various questions and check whether his responses are correct that also may be used as an entertaining or easy to use reference source.

12 Claims, 8 Drawing Sheets

BOOK WITH ROTATING DEVICE

FIELD OF INVENTION

The present invention broadly relates to a book with at least one rotating device in at least one leaf or cover. More particularly, the present invention relates to a book that is entertaining and useful for teaching, learning or testing one's knowledge concerning a variety of subjects. Most particularly, the present invention is related to a book with a rotating device that allows the user to vary questions in the book and check whether her/his answers are correct and/or serves as an entertaining and/or easy to use reference source.

BACKGROUND OF INVENTION

Over the years, a variety of aids have been used to help teach or learn subjects such as arithmetic, geography and languages, including instruction books, flash cards and a variety of games. Such aids are particularly useful in teaching children. These aids also can be sources of entertainment and can focus on topics such as trivia, jokes, and riddles. The aids also can be useful as a reference source on all kinds of topics.

Conventional books, flash cards and games have met with varying degrees of success in providing an educational and entertaining tool. While books, flash cards and games can be useful with the assistance and in the presence of an instructor, they are not usually fun or motivating. Other educational methods are too complex, difficult to use and/or not fun and, therefore, do not successfully accomplish their objectives.

Aids of the aforementioned types take many forms. For instance, Lassowsky, U.S. Pat. No. 6,716,033, teaches a system using cards wherein objects can be combined to learn mathematical operations. Greenberg, U.S. Pat. No. 6,447,300, teaches an educational card game for teaching mathematics and words associated with numbers. Wood et al., U.S. Pat. No. 6,648,647, teaches an electronic toy with a rotating element designed to teach children the alphabet, numbers and sounds.

No prior art, however, teaches or suggests a book with at least one rotating device that allows the user to vary questions in the book and check whether her/his answers are correct. Further, no prior art teaches or suggests a book with at least one rotating device that serves as an entertaining or easy to use reference source.

SUMMARY OF INVENTION

The present invention concerns a book with a rotating element that allows the user to vary and experiment with text associated with one or more topics such as, but not limited to, arithmetic, geography, languages, history, spelling, animals, jokes, riddles, trivia, recipes and the like.

Thus, it is an object of the present invention to provide a useful book that stimulates the desire of a child or other user to learn.

It is a further objective of the present invention to provide a book that entertains the user.

It is a further objective of the present invention to provide a book that can be an entertaining and useful reference source.

It is a further objective of the present invention to provide a book that is compact, portable and easy to carry.

It is still a further object of this invention to provide a device that is effective, easy to use and relatively cost-efficient to manufacture.

These and other objectives will become evident to those skilled in the art from the specification. To these ends, the book of the present invention comprises a front cover; a back cover; at least one leaf between the front and back covers; wherein the front cover, back cover and at least one page are bound together; wherein at least one of the front cover, back cover or leaf are provided with a rotating device comprising one or more image elements adapted to one or more topics of interest.

BRIEF DESCRIPTION OF THE INVENTION

DETAILED DESCRIPTION OF THE INVENTION

The following description of preferred embodiments is presented to illustrate the present invention and is not to be construed to limit the scope of the claims in any manner whatsoever.

Figure 1:
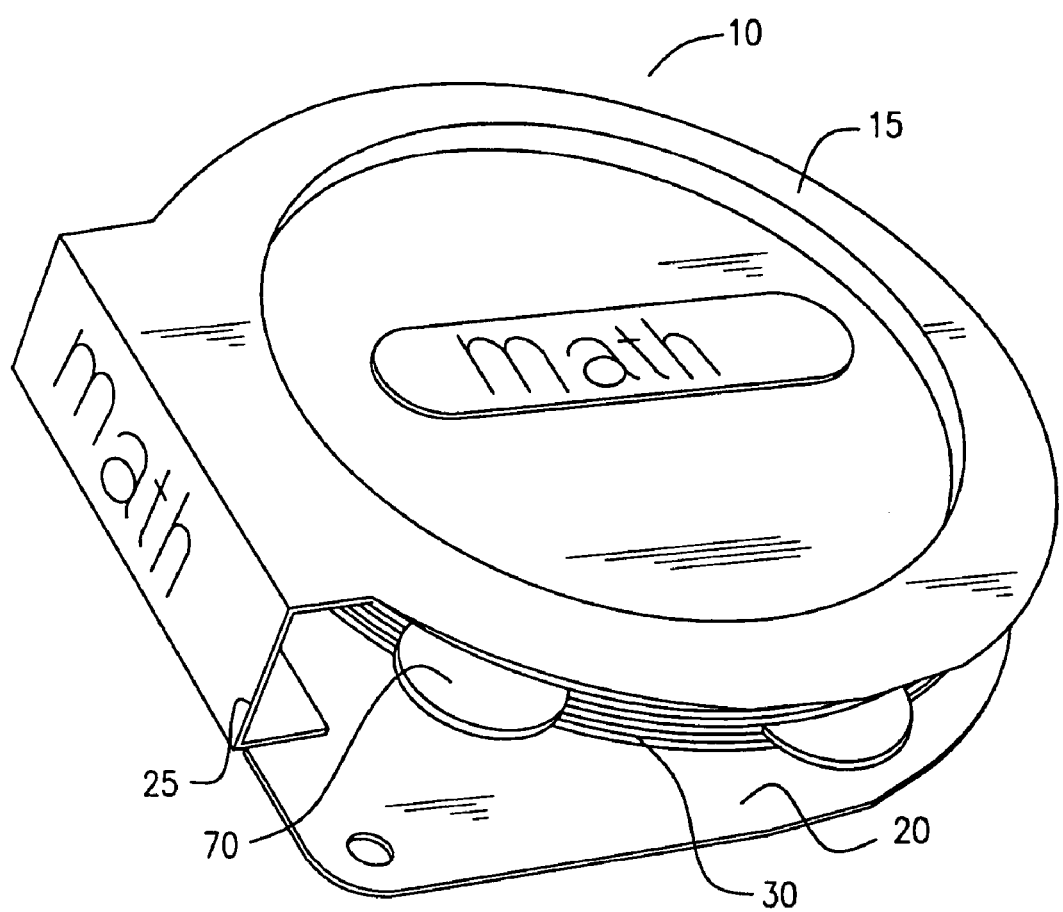
FIG. 1 depicts a top view of an embodiment of the present invention.

For purposes of illustration, many of the embodiments described below are described with reference to a child and the subject multiplication. Although children and multiplication are discussed in detail, it is to be understood that the user of the invention could be of any age and that the invention is suited to other topics including, but not limited to, one or more of any arithmetical or math function, art, geography, languages, science, spelling, animals, jokes, riddles, trivia and the like. Further, it is to be understood that, in certain embodiments, the present invention is useful as a reference source for FIG. 1 shows a book 10 according to one embodiment of the invention. The book depicted comprises a front cover 15, a back cover 20, a means for connecting the back cover to the front cover 15, and at least one leaf 30. At least one leaf also has at least one actuator (see FIG. 3). The book may have any suitable dimensions. For example, in some embodiments, the book may be less than about 5 inches high and less than about 1 inch thick. The front cover 15 and back cover 20 and leaf(s) 30 may be constructed of any material known to those skilled in the art that provides sufficient rigidity and printability. These materials may include, but are not limited to, paper, cardboard, textiles, foam or plastics or any combination thereof. Preferred is cardboard that is about $\frac{1}{16}$ of an inch thick but may also be as thin as about 0.02 inches.

In the depicted embodiment, the front cover is attached to the back cover by means of a protrusion from the front cover that is folded around the pages and integrally attached to the back cover. However, any means for connecting the back cover to the front cover known in the art may be employed in practicing the present invention, including glue adhesion, ring binding, male/female mating-type bindings, spiral bindings, stitching, and slide-on type clip bindings. Further, the book may be bound in concertina or other fashion. The operation of the book is explained below with reference to FIG. 3 through FIG. 5A. At least one embodiment of the construction of the book further is explained with regard to FIG. 6.

Figure 2:
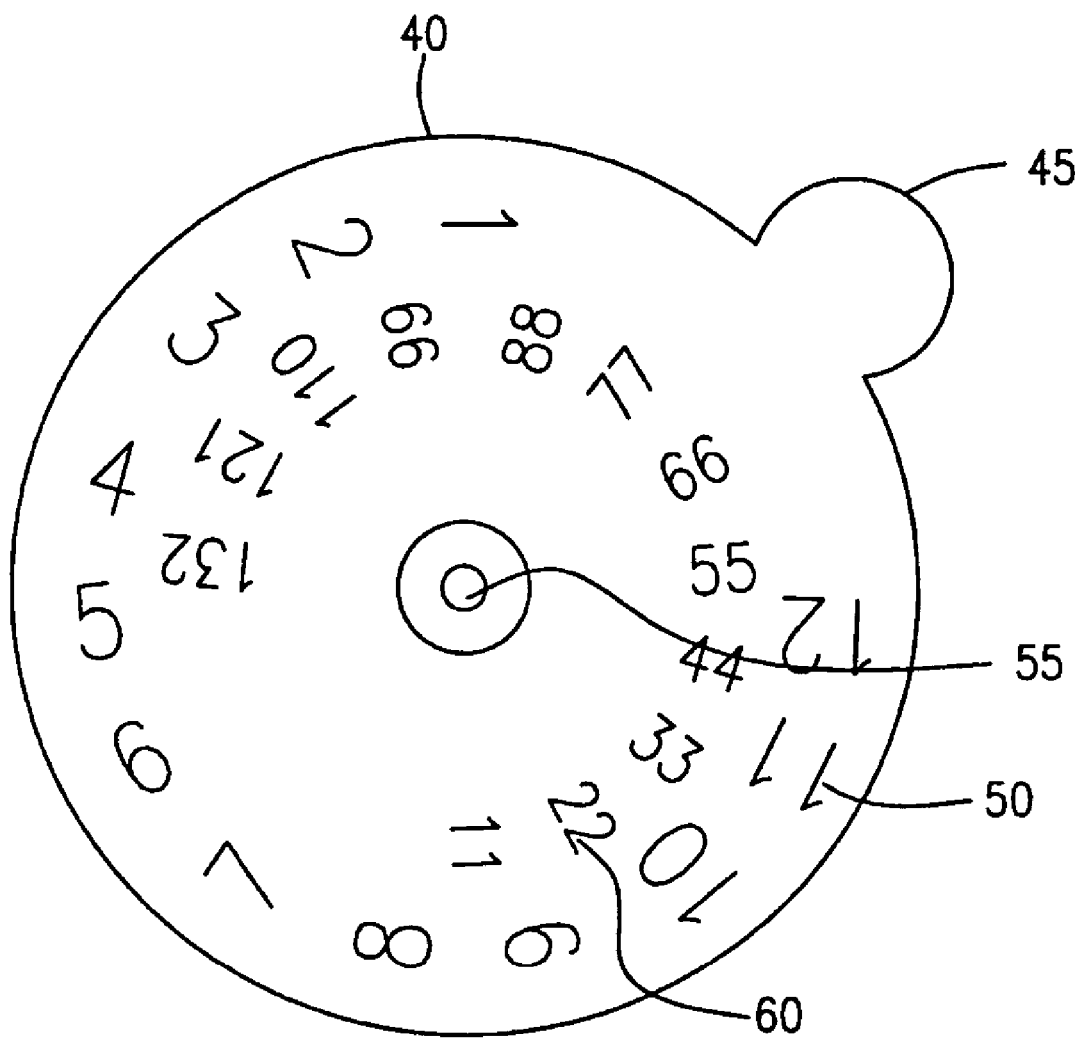
FIG. 2 depicts one embodiment of a rotating device that is useful in the practice of the present invention.

FIG. 2 depicts an embodiment of the rotating device 40 of the present invention. In the depicted embodiment, the rotating device is circular except for a nub 45 for attaching the actuator (not shown). In other embodiments, the actuator may be attached to the rotating device by any other means known to those skilled in the art. The rotating device includes a first set of image elements 50. Each image element in the first set is positioned at a first radial distance from the axis 55. The rotating element also may include a second set of image elements 60, as shown. Each image element in the depicted second set is positioned at a second radial distance from the axis 55. The first distance can be different than the second distance so that the first set of image elements and the second set of image elements respectively form two circles of different radii.

In some embodiments, the image elements in the first set may correspond to image elements in the second set. Further, the rotating device may have related or different image element sets on its reverse side as well. The image elements may be numbers, letters, words or pictures or any combination thereof. Further, the rotating device also may include less than or more than two sets of actually aligned image elements.

The rotating device 40 may have any dimensions suitable based on the size of the book and its leaves. The rotating device may be constructed of any material known to those skilled in the art that provides sufficient rigidity and printability. These materials may include, but are not limited to, paper, cardboard, textiles, foam, plastics or any combination thereof. Preferred is cardboard that is about 1/16 of an inch thick but may also be as thin as about 0.02 inches.

Figure 3:
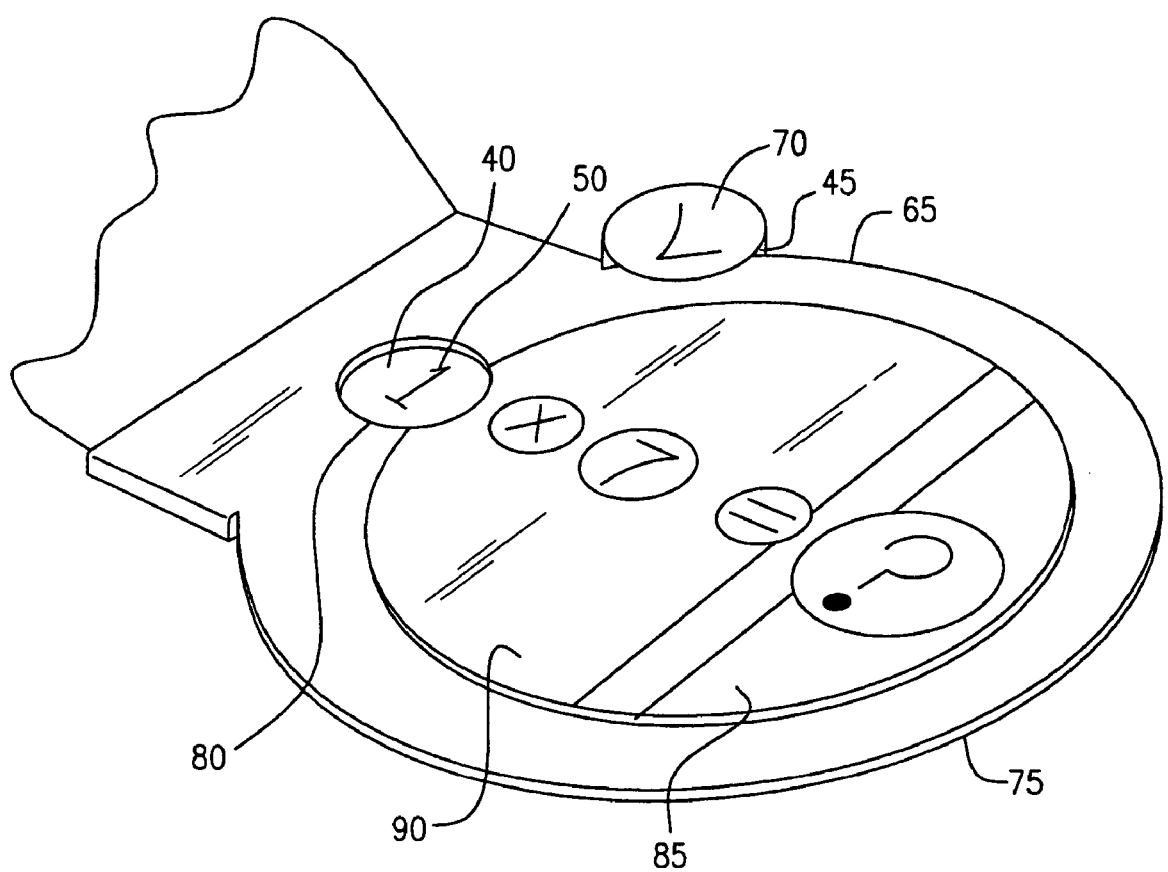
FIG. 3 depicts an embodiment of the present invention in an open position with the window flap in the closed position.

FIG. 3 depicts an embodiment of the top page of one leaf of the present invention in an open position. In the illustrated example, the top page 65 at least partially covers a rotating device 40 underneath it. The rotating device 40 may be turned by use of an actuator 70. In the depicted embodiment, the actuator is a round tab that is affixed to the nub 45 and overlaps the top page 65 and bottom page 75 to produce a unique appearance as well as an additional clamping force between top page 65 and bottom page 75. See also FIG. 7. However, the actuator may be attached to the rotating device by any means known to those skilled in the art. When the actuator is moved, it causes the rotating device to rotate about an axis between the top page 65 and the bottom page 75 of the leaf. The actuator may have any dimensions suitable based on the size of the book and its pages and may be constructed of any material known to those skilled in the art that provides sufficient rigidity and printability. These materials may include, but are not limited to, paper, cardboard, textiles, foam or plastics or any combination thereof. Preferred is cardboard that is about 1/16 of an inch thick but may also be as thin as about 0.02 inches. The actuator 70 also may be a blank location or may bear numbers, letters, words, pictures or any combination thereof.

Also shown is a window 80 in the top page exposing an image element 50 on the rotating device. The window may be die cut and be of any dimensions suitable to the size of the page and the image element to be exposed. It is understood that the size, location, and number of windows may vary in embodiments of the invention. As explained below, in embodiments where more than one set of image elements are used, the windows may be positioned such that corresponding elements of each of the sets of image elements are exposed when the actuator is positioned.

Figure 4:
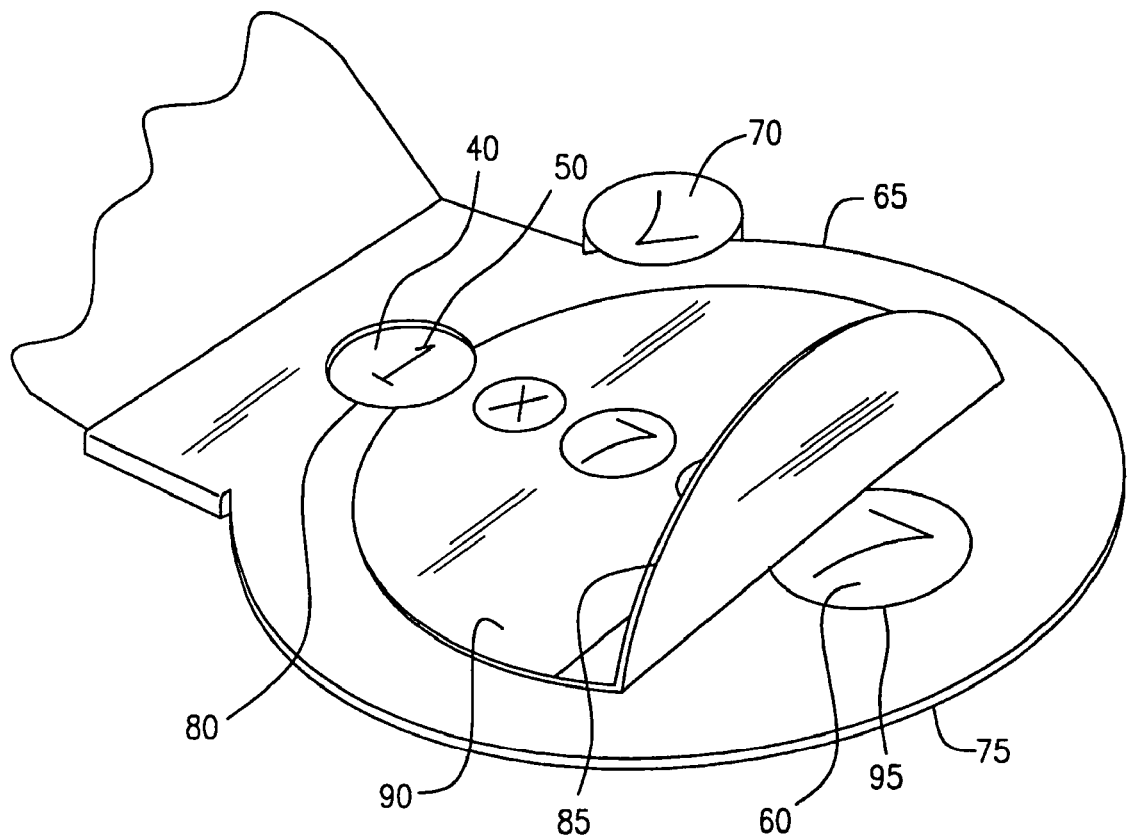
FIG. 4 depicts an embodiment of the present invention in an open position with the window flap in the opened position and the actuator in a particular position.

Also shown is a window flap 85 that may cover an additional window or windows (see also FIG. 4). Further shown is a text flap 90 that may cover text or graphics on the page and/or include text on its underside (see also FIG. 5A). The window flap 85 and text flap 90 may have any dimensions suitable based on the size of the book and its pages and may be constructed of any material known to those skilled in the art that provides sufficient rigidity and printability. Again, these materials may include, but are not limited to, paper, cardboard, textiles, foam or plastics or any combination thereof. Again, preferred is cardboard that is about 1/16 of an inch thick but may also be as thin as about 0.02 inches. It is understood that flaps need not be used and that the size, location, and number of flaps may vary in embodiments of the invention. In alternative embodiments, sliding doors or other expedients also may be used to cover text, graphics and/or windows. As explained below, in embodiments where more than one set of image elements are used, the windows may be positioned such that corresponding elements of each of the sets of image elements are exposed when the actuator is positioned.

To operate the exemplary book, the user manipulates the actuator 70 to turn the rotating device such that an image element 50 from the first set of image elements on the rotating device that may be related to numbers, letters, words or pictures (or any combination thereof) visible on the page is exposed in the window 80. Such manipulation also positions an image from the second set of image elements on the rotating device in a second window 95 (see FIG. 4). In the depicted embodiment, the image exposed in the window is the number 1 and the text is the multiplication sign, the number 7 and the equals sign. Thus, the user has created the arithmetic equation "1×7=." In this case, the actuator 70 also bears the number 7 to represent to the user that this page concerns the 7 times table. Manipulation in this manner may prompt the user to conjure an answer to the equation. As illustrated in FIG. 4, the user can thereafter check his answer by lifting the window flap 85 to reveal the answer that is the related image from the second set of image elements 60 of the rotating device, in this case, the answer "7" (see FIG. 4). Hence, the user now knows that 1×7=7. Of course, expedients other than a flap, such as a hole member can be employed to reveal the covered image element.

Figure 5:
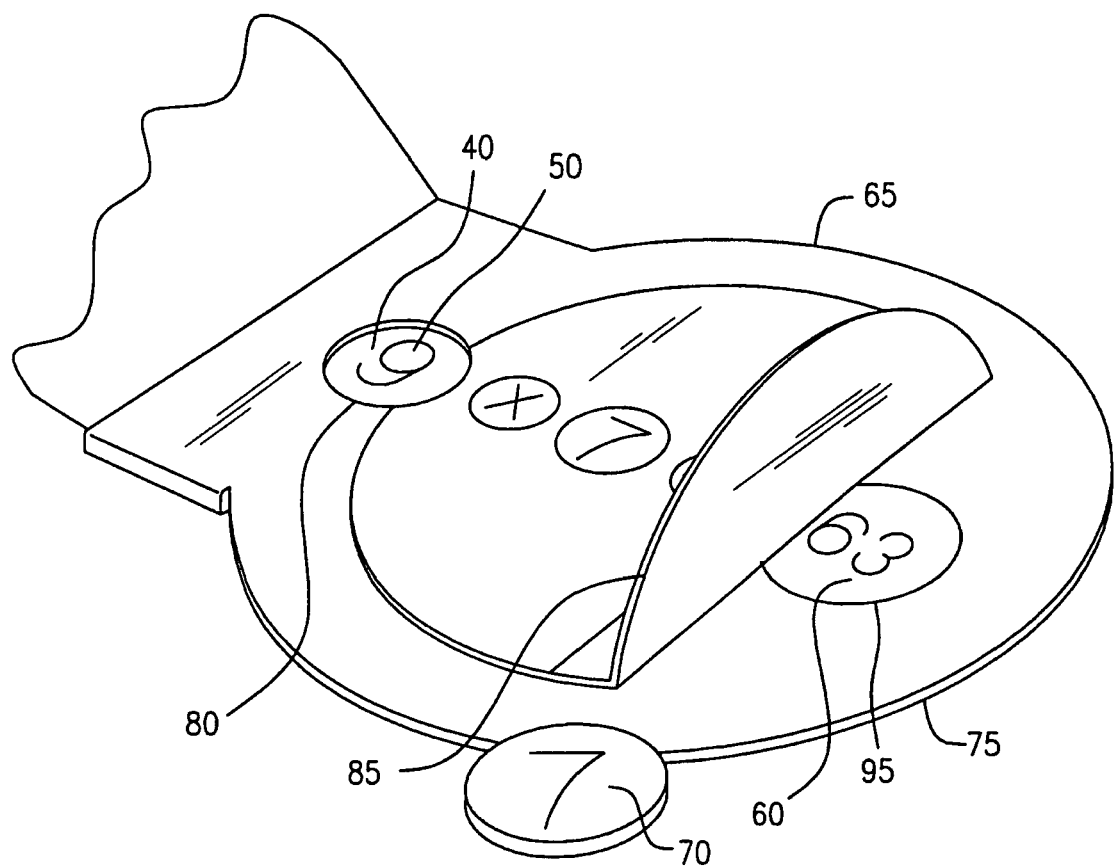
FIG. 5 depicts an embodiment of the present invention in an open position with the window flap in the opened position wherein the actuator has been repositioned.

FIG. 5 further depicts an exemplary use of the book of the present invention. Therein is shown the same page depicted in FIG. 3 and 4, however, the actuator 70 has been positioned such that the image 50 from the first set of image elements on the rotating device exposed in the window 80 is the number 9. Such manipulation also exposes the corresponding image from the second set of image elements on the rotating device in a second window 95. As illustrated in FIG. 5, the user can check his answer to the mathematical equation he or she created (9×7) by lifting the window flap 85 to reveal the answer that is the image from the second set of image elements 60 of the rotating device under the flap, in this case, the number 63. In this way the user may learn and/or practice multiplication.

Figure 5A:
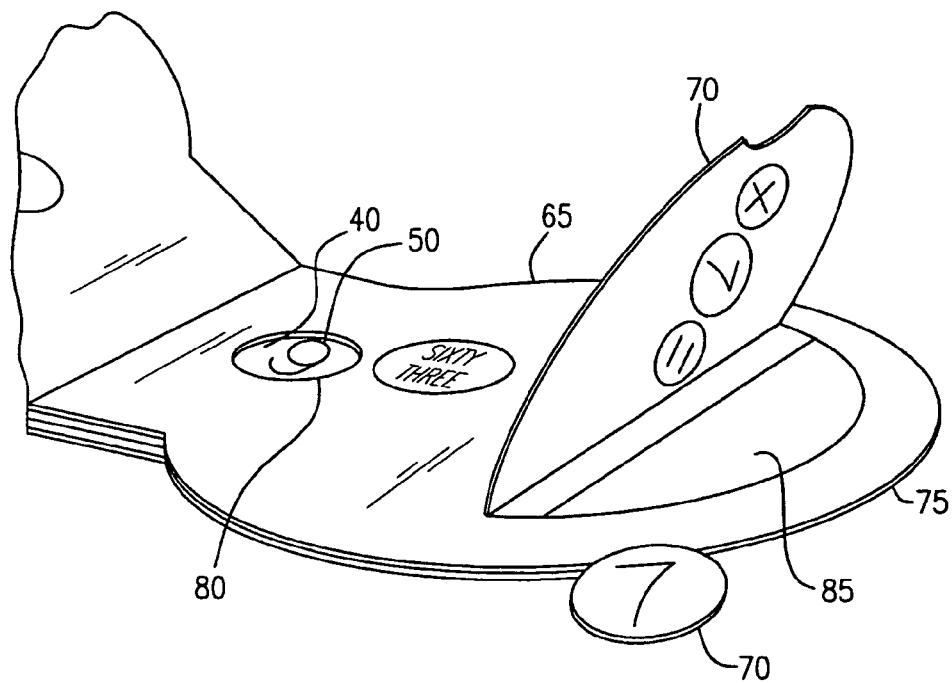
FIG. 5A depicts an embodiment of the present invention in an open position with a text flap in the opened position.

As depicted in FIG. 5A, the book also may employ one or more text flaps 90 to cover numbers, letters, words, pictures or any combination thereof on the page. Such flaps may be used to supply hints or complement the subject matter of the page or book. Such flaps also may bear text or graphics on its underside or topside.

The bottom page of the leaf 75 also may have window(s), text and/or flap(s) that operate in connection with sets of image elements on the reverse side of the rotating device. For example, in the embodiment depicted in FIGS. 3-5A, the bottom side of the leaf could operate in conjunction with the actuator and rotating device to comprise the times table for the number 8. Further, the book may have six (6) leaves or twelve (12) pages, i.e., a page for each of the times tables for the numbers 1 through 12. Hence, a user may learn and/or practice the multiplication tables for the numbers 1 through 12.

Although the embodiment described above concerns the subject of multiplication, a large number of obvious variations will subject themselves to one skilled in the art. For example, the book can relate to any arithmetical function. Further, it is possible to juxtapose the actuator, text or graphics on the page or on or under the flap(s) with image elements on the rotating device in limitless ways. For example, in another embodiment, the actuator may be printed with an arrow that can be pointed to text or graphics printed on the circumference of the page whereby one or more image elements on the rotating device are exposed through one or more windows on the page.

Further, the text and/or graphics on the actuator, page, flap(s) and/or rotating device need not relate to arithmetic but can relate to other topics including, but not limited to, art, geography, history, languages, spelling, animals, jokes, riddles, recipes, trivia and the like. For example, the actuator may bear the name of a state or a country and allow the user to turn the actuator such that a topic such as capital or flag is presented in a window and the name of the capital or a picture of the flag is exposed in a second window. Alternatively, again in the context of geography, the exposed window may bear a map of a location and the covered window may indicate the name of the location. Further, although the depicted embodiment illustrates two windows and two image sets on the rotating device, one, two or more sets of windows and or image sets may be used.

In yet other embodiments, the present invention may be used as an entertaining and/or easy to use reference source. For example, the actuator may be turned to select the name of food in a first window or on the page to expose in one or more windows a picture of the item, the ingredients required and/or method of preparation.

In still another embodiment, the user may employ the actuator to select from a number of possible answers printed on the circumference of the page to answer a question visible on the page. When the answer selected is correct, the window will expose a signal that the selection was correct. When the answer is incorrect, another signal (e.g., "try again") might appear in the window.

In yet other embodiments, the book may be made with one or more or all of the image elements being blank locations such that the user can interact with and/or individualize the book by adding images using a writing instrument, and/or stickers and/or other means. Further the book may be made with some or all of the text and/or graphics being blank locations such that the user can interact with and/or individualize the book by adding words, numbers pictures or the like using a writing instrument, and/or stickers and/or other means.

Figure 6:
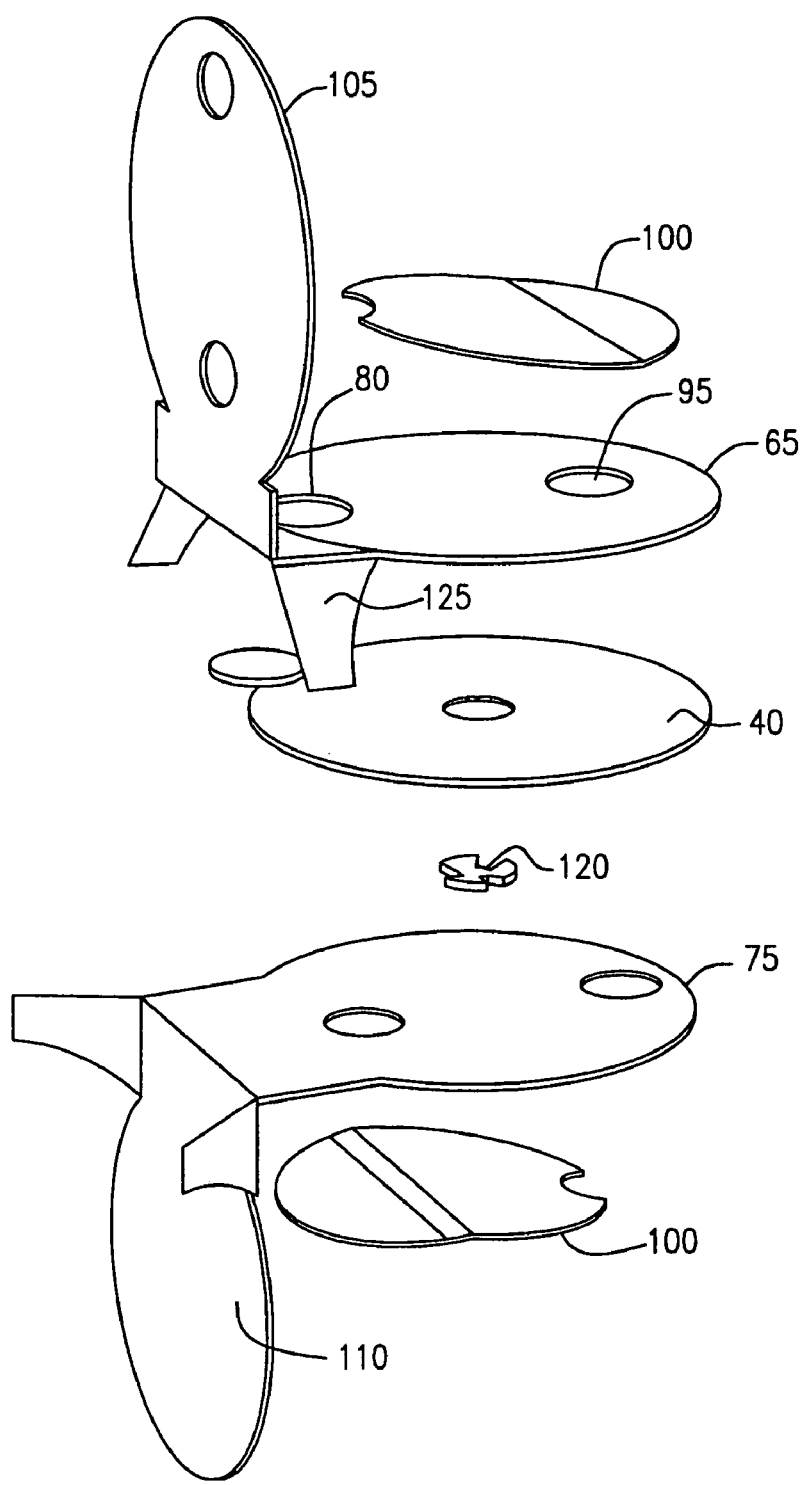
FIG. 6 depicts an exploded view of one embodiment of a leaf of the book of the present invention.

FIG. 6 depicts an exploded view of one embodiment of the manner of construction of one leaf of the book utilizing the rotating device. The leaf depicted is comprised of two flap formers 100; a top page 65; a bottom page 75; a proceeding page 105 and a following page 110; a first window 80 and a second window 95 formed in each of the two halves of the top page and bottom page; a rotating device 40 between the top page and bottom page; a rivet 120 around which the rotating device turns; and an actuator 70 (not shown) for moving the rotating device 40 between said pages whereby different parts of the rotating device successively are exposed through the windows 80, 95 as the actuator 70 is moved around the circumference of the pages.

In the depicted embodiment, the flap formers 100 may be secured to the pages by glue adhesion. However, any means known to those skilled in the art may be used. In the depicted embodiment, the rivet 120 may be comprised of a cardboard, paper or other rigid material similar to that used for the front cover. Again, these materials may include, but are not limited to, paper, cardboard, textiles, foam or plastics or any combination thereof. Again, preferred is cardboard that is about 1/16 of an inch thick but may also be as thin as about 0.02 inches. Further, the rivet is secured to the top page and bottom page in manner such that the rotating element is free to turn between the pages. The rivet may be secured to the pages by glue adhesion. In alternate embodiments, the rivet may be made of metal or plastic and/or also pierce the two pages. However, any means known to those skilled in the art may be used.

Also depicted in FIG. 6 is one embodiment of the binding means. In the depicted embodiment, the top page and the bottom page are held together by folding and gluing the tabs 125 of the former to the bottom of the latter. Further, a subsequent leaf is bound to the first leaf by means of gluing tabs on the following page 110 to the proceeding page of a new leaf (not shown).

Figure 7:
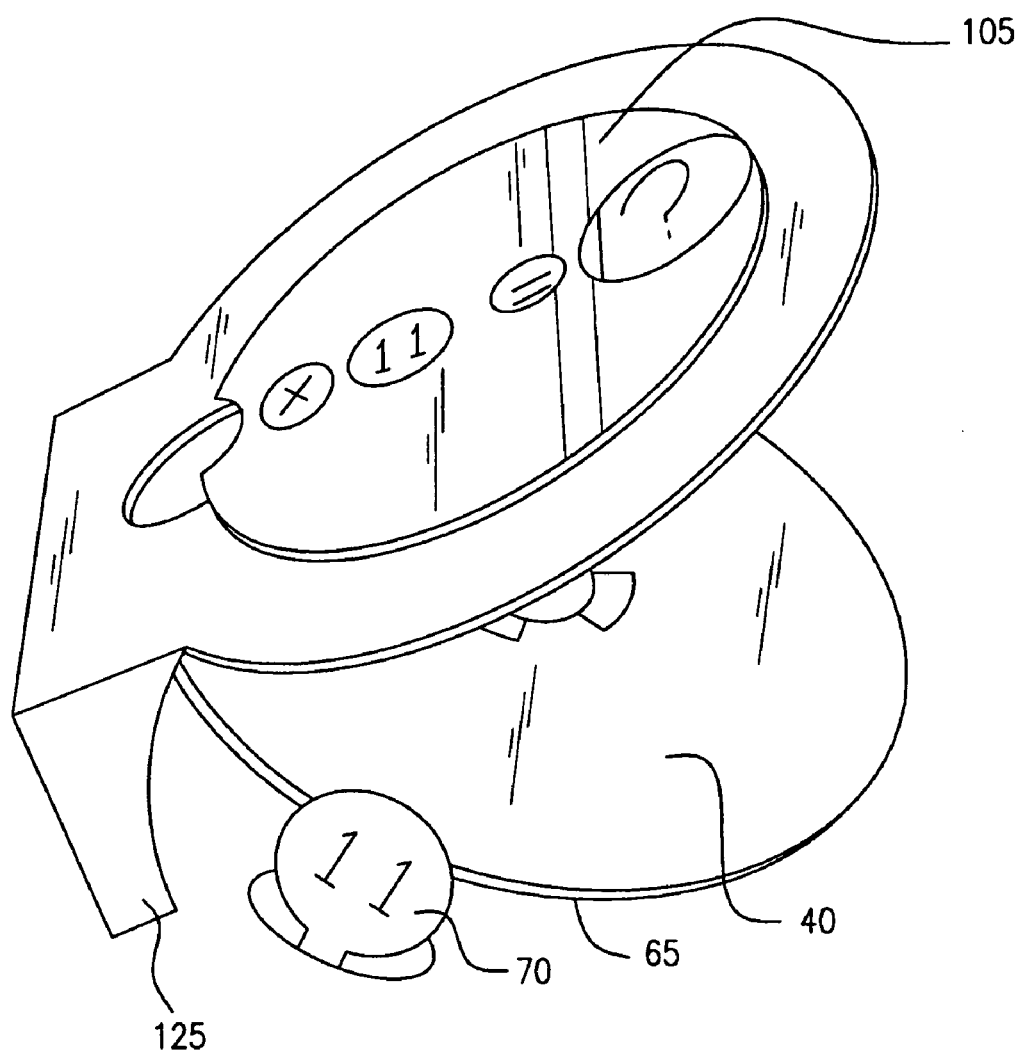
FIG. 7 depicts another embodiment of one leaf of the book of the present invention.

As depicted in FIG. 7, in other embodiments, separate leaves may be made by sandwiching the rotating device within the proceeding page 105 and top page 65. In such embodiments, several or more leaves constructed in this manner may then be bound by a binding means. In the practice of the present invention, any binding means known in the art may be employed including, but not limited to, glue adhesion, ring binding, male/female mating-type bindings, spiral bindings, stitching, and slide-on type clip bindings.

Many variations of the present invention will suggest themselves to those skilled in the art in light of the above-detailed description. For example, in other embodiments, the back cover or front cover also may comprise a leaf housing a rotating device. All such obvious modifications are within the full-intended scope of the claims.

I claim:

1. A book comprising:
   a front cover;
   a back cover;
   at least one leaf between said front cover and said back cover;
   a binding means for binding said front cover, said back cover and said at least one leaf together;
   wherein at least one of said leaf is comprised of:
   a first outer surface comprising an upper side of a top page and a first inner surface comprising a lower side of said top page wherein said lower side of said top page is the reverse side of said upper side of said top page;
   a second outer surface comprising a lower side of a bottom page and a second inner surface comprising an upper side of said bottom page wherein said upper side of said bottom page is the reverse side of said lower side of said bottom page and wherein said lower side of said top page and said upper side of said bottom page are joined to form said leaf;

a rotating device between said first inner surface of the top page of the leaf and said second inner surface of the bottom page of the leaf; and at least one set of image elements on at least one side of the rotating device;

an actuator capable of causing the rotating device to rotate between said first inner surface of said top page and said inner surface of said bottom page;

at least one window selectively exposing at least one image element through at least one page of at least one said leaf.

2. A book as in claim 1 wherein each image element in each set of image elements is positioned at the same radial distance from the axis.

3. A book as in claim 1 comprised of from about 1 to about 6 leaves.

4. A book as in claim 1 wherein said rotating device is comprised of from about 1 to about 6 sets of image elements each set of which is at a different radial distance from the axis.

5. A book as defined in claim 1 wherein at least one said window may be selectively closed or opened.

6. A book comprising:
  a front cover;
  a back cover;
  at least one leaf between said front cover and said back cover;
  a binding means for binding said front cover, said back cover and said at
  least one leaf together:
wherein at least one of said leaf is comprised of;
  a rotating device between the top page of the leaf and the bottom page of the leaf;
  at least one set of image elements on at least one side of the rotating device;
an actuator capable of causing the rotating device to rotate between said top page and said bottom page;
at least one window selectively exposing at least one image element through at least one page of at least one said leaf wherein said window may be selective closed or opened and wherein the means for selectively closing or opening said window is a flap or door.

7. A book comprising:
  a front cover;
  a back cover;
  at least one leaf between said front cover and said back cover;
  a binding means for binding said front cover, said back cover and said at least one
  leaf together;
wherein at least one of said leaf is comprised of:
  a first outer surface comprising an upper side of a top page and a first inner surface comprising a lower side of said top page wherein said lower side of said top page is the reverse side of said upper side of said top page;
  a second outer surface comprising a lower side of a bottom page and a second inner surface comprising an upper side of said bottom page wherein said upper side of said bottom page is the reverse side of said lower side of said bottom pane and wherein said lower side of said top page and said upper side of said bottom page are joined to form said leaf;
  a rotating device between said first inner surface of the top page of the leaf and said second inner surface or the bottom page of the leaf; and
  at least one set of image elements on at least one side of the rotating device;
an actuator capable of causing the rotating device to rotate between said first inner surface of said top page and said second inner surface of said bottom page;
at least one window selectively exposing at least one image element through at least one page of at least one said leaf; and
wherein said rotating device has a first set of image elements positioned at a radial distance from the axis and a second set of image elements positioned at a second radial distance from the axis and wherein at least one image from each set of images are selectively exposed in combination through windows on at least one page of at least one said leaf.

8. A book comprising:
  a front cover;
  a back cover;
  at least one leaf between said front cover and said back cover;
  a binding means for binding said front cover, said back cover and said at least one leaf together;
wherein at least one of said leaf is comprised of:
  a rotating device between the top page of the leaf and the bottom page of the leaf;
  at least one set of image elements on at least one side of the rotating device;
an actuator capable of causing the rotating device to rotate between said top page and said bottom page;
at least one window selectively exposing at least one image element through at least one page of at least one said leaf; and
wherein said rotating device has a first set of image elements positioned at a radial distance from the axis and a second set of image elements positioned at a second radial distance from the axis and wherein at least one image from each set of images are selectively exposed in combination through windows on at least one page of at least one said leaf and wherein said exposed image elements combine with text or graphics on said page to form arithmetical equations.

9. A book as defined in claim 8 wherein said arithmetical equations are multiplication equations.

10. A book as defined in claim 8 wherein said arithmetical equations are addition equations.

11. A book as defined in claim 8 wherein said arithmetical, equations are subtractions equations.

12. A book as defined in claim 8 wherein said arithmetical equations are division equations.

* * * * *